United States Patent [19]

Kuhlmann et al.

[11] Patent Number: 4,759,511
[45] Date of Patent: Jul. 26, 1988

[54] APPARATUS FOR FEEDING THE FREE END OF A MICROFILM TO A TAKEUP REEL AND FOR WINDING THE MICROFILM THEREON

[75] Inventors: Friedhelm Kuhlmann, Cologne; Heinz G. Mobius, Düsseldorf, both of Fed. Rep. of Germany

[73] Assignee: Minnesota Mining and Manufacturing Company, St. Paul, Minn.

[21] Appl. No.: 43,355

[22] Filed: Apr. 28, 1987

[30] Foreign Application Priority Data

May 7, 1986 [DE] Fed. Rep. of Germany ....... 3615496

[51] Int. Cl.⁴ .................... G03B 1/58; G03B 21/11; B65H 18/08; B65H 18/26
[52] U.S. Cl. .................. 242/67.1 R; 242/74; 242/76; 242/195
[58] Field of Search .................. 242/67.1 R, 71.1, 74, 242/76, 195, 210, 179

[56] References Cited

U.S. PATENT DOCUMENTS

| | | | |
|---|---|---|---|
| 3,395,870 | 8/1968 | Klinger | 242/67.1 R X |
| 3,628,746 | 12/1971 | Di Francesco | 242/195 X |
| 3,740,001 | 6/1973 | Wroblewski | 242/195 X |
| 4,111,379 | 9/1978 | Luscher | 242/71.1 |
| 4,504,026 | 3/1985 | Serizawa et al. | 242/76 X |
| 4,544,110 | 10/1985 | Nagel et al | 242/195 X |

*Primary Examiner*—David Werner
*Attorney, Agent, or Firm*—Donald M. Sell; James A. Smith; David W. Anderson

[57] ABSTRACT

An automatic film takeup reel to capture the free end of a film and wind the end, must guide the film along a feed passage formed by a housing toward a rotating reel of a soft material. The end of the film is held to the reel by a ball biased by a spring toward the reel and is directed around a cavity until wound. A spring biased arm then shifts the housing axially of the reel to afford continued winding.

4 Claims, 2 Drawing Sheets

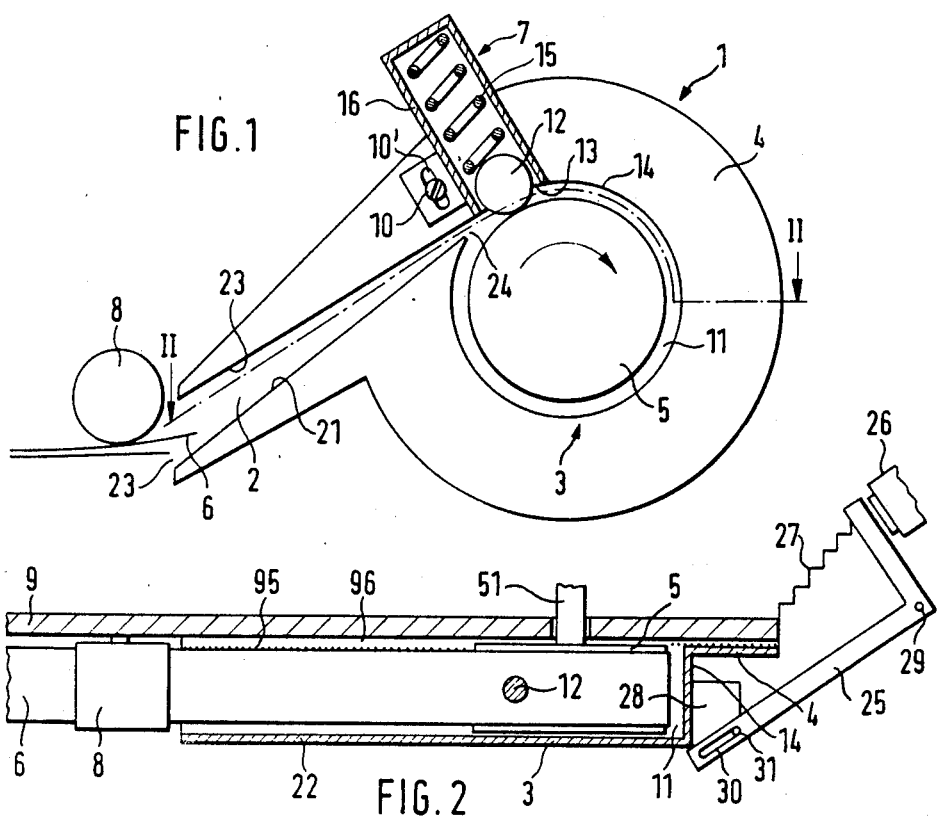
FIG. 1
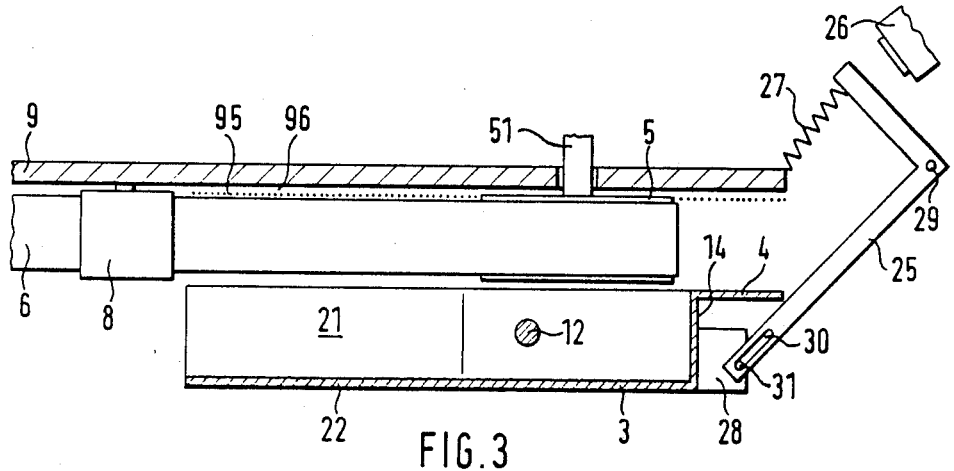
FIG. 2
FIG. 3

APPARATUS FOR FEEDING THE FREE END OF A MICROFILM TO A TAKEUP REEL AND FOR WINDING THE MICROFILM THEREON

BACKGROUND OF THE INVENTION

1. Field of the Invention

The invention relates to apparatus for feeding the free end of a microfilm to a takeup reel and in one aspect to a device for winding the microfilm on a takeup reel.

2. Description of the Prior Art

Apparatus of the aforesaid nature has been known. In such apparatus, the free end of a microfilm, having moved through a viewing station, is fed to a takeup reel and wound up thereon. In order to keep the microfilm coil on the takeup reel from shifting laterally in the takeup process, box-shaped shell members are provided to accommodate one half of the wound-up microfilm coil and of the takeup reel each so as to guide the windup coil between the inner walls of such shell members. Depending on the instantaneous size of the coil (or on the length of microfilm) on the takeup reel, both shell members must be swung radially to provide sufficient space for the coil being wound up on the takeup reel.

A major disadvantage of such apparatus is that the mechanism for swinging the two shell members is relatively complex. Also, the aforesaid radial swinging movement of the apparatus presents problems in that the microfilm end moved to the takeup reel has to be secured to the peripheral surface thereof.

It is the object underlying the present invention to so improve on means for feeding the free end of a microfilm to a takeup reel of the type stated above that relatively little space is needed to provide the microfilm coil wound up on the takeup reel with the lateral support.

SUMMARY OF THE INVENTION

The apparatus of the present invention for winding the microfilm on the takeup reel includes means laterally enclosing the coil formed on the takeup reel and a housing is mounted for movement in the direction of the axis of takeup reel between a first and a second position. The housing includes a feed passage and a housing portion aligned with the feed passage. The housing portion concentrically surrounds the takeup reel in the first position of the housing and is pivoted away from the takeup reel in the second position of the housing. The feed passage and housing portion are open on the side facing the takeup reel in the second position of the housing and is substantially closed in the first position thereof by a stationary wall. The feed passage is oriented in the first position of the housing to receive the free end of a strip of microfilm and to introduce said end into the gap between the peripheral surface of the takeup reel and the inner surface of housing portion. Means are provided for pressing the free end of the microfilm against the peripheral surface of the takeup reel and to grasp the free end of microfilm advanced thereto by the feed passage. The housing has a supporting wall disposed in the second position in a plane normal to the axis of takeup reel on said one side adjacent the film coil wound on takeup reel. The stationary wall is disposed on the other side of the film coil from the supporting wall.

An essential advantage of the invention resides in the fact that the inventive apparatus or housing thereof for feeding the free end of a microfilm (or of a leader of different width attached thereto) to a takeup reel may be axially swung from the film coil region after a predetermined length of film or of the leader has been wound up on the takeup reel. This swinging movement will create the space needed for the microfilm coil increasing in size as the winding-up operation proceeds. Such lateral constraint of the wound-up microfilm coil is preserved after the pivoting action. The subject apparatus ensures that no additional space will be needed in a radial direction—in contrast to the prior device noted above, in which the two housing members are pivoted radially. Instead, the space required in the axial direction needs merely be sufficient to axially displace the subject apparatus by a distance corresponding to about one width of the microfilm.

Another advantage of the present invention is that the mechanism enabling the present apparatus to be pivoted may be relatively simple in construction.

In the present invention, a ball is urged by a spring against the peripheral surface of the takeup reel, ensuring in an advantageous manner that the microfilm end which has moved in between the ball surface and the peripheral surface of the takeup reel is urged firmly onto the latter. For automatically feeding the free end of the microfilm between the ball surface and the peripheral surface of the takeup reel, the inventive apparatus includes a special feed-in passageway which advantageously is formed integral with the housing of the inventive apparatus.

The dependent claims recite further advantageous embodiments of the present invention.

DESCRIPTION OF THE DRAWING

The invention and its embodiments will now be explained in detail under reference to the drawing, wherein:

FIG. 1 is a schematic side view of the present invention for feeding the free end of a microfilm to a takeup reel;

FIG. 2 is a longitudinal sectional view of the embodiment of FIG. 1 with the apparatus in its first position, said section being taken along line II—II;

FIG. 3 is a sectional view similar to FIG. 2, with the apparatus in its second position.

DETAILED DESCRIPTION OF THE INVENTION

Figure 4:
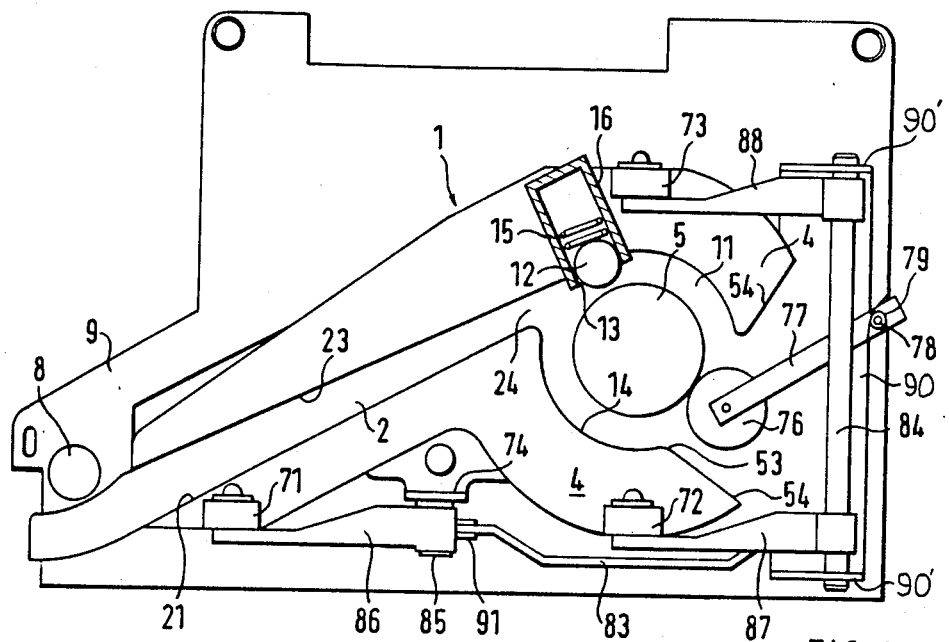
FIGS. 4 and 5 are a side and a plan view showing preferred embodiments of the housing pivoting device of the invention.

As shown schematically in FIG. 1, the present apparatus for feeding the free end of a microfilm to a takeup reel and for winding the microfilm up thereon comprises a housing 1 consisting essentially of a feed-in passage 2, a housing section accommodating the takeup reel in a first position of the housing, at least one supporting wall 4 disposed to extend laterally adjacent the microfilm coil on takeup reel 5 in a second position of the housing so as to provide guidance to the coil and a mechanism 7 to firmly urge the free end of microfilm 6 fed in through passage 2 against the peripheral surface of take-up reel 5. Also, the present apparatus comprises pivoting means by which housing 1 may be removed between its first and second positions in the direction of the axis of takeup reel 5.

When the housing 1 is in its first position, microfilm 6 is introduced into the passage 2 of the housing from a guide roll 8 disposed downstream of the viewing station in the microfilm apparatus. Guide roll 8 may be mounted for rotation in any desired manner on a stationary wall 9 or other structure of the microfilm apparatus. Wall 9 has a bore therein to receive shaft 51 of takeup reel 5 to locate takeup reel 5, which preferably consists of a soft synthetic material, in a manner such that its peripheral surface is aligned with guide roll 8 and also with passage 2 when housing 1 is in its first position. Passage 2 comprises a lower guide track 21 extending in the direction of a film movement from a location downstream of guide roll 8 towards the peripheral surface of takeup reel 5, a front wall 22 (FIG. 2), and a top wall 23. Passage 2 is open on the side facing wall 9. It its first position, housing 1 is in contact with wall 9, whereby in that first housing position wall 9 closes passage 2. As a result, the free end of a microfilm 6 introduced in inlet opening 23 will in that first housing position be guided positively through the guiding passage 2, which is closed on all sides, to outlet opening 24 of passage 2. Preferably inlet opening 23 is relatively large in size to easily and safely receive the free end of a microfilm 6 into passage 2 after it has left guide roll 8. Outlet opening 24 of passage 2 is relatively smaller in size and communicates with a cylindrical cavity inside housing portion 3 which in the first housing position accommodates takeup reel 5. The cylindrical cavity concentrically surrounds takeup reel 5 in a manner such that the inner surface of cavity wall 14 is spaced from the peripheral surface of takeup reel 5 by a gap 11 having a pre-determined width. Outlet opening 24 of passage 2 is located in housing 1 so that the free end of a microfilm 6 is guided in the cavity towards the peripheral surface of, or tangentially to, takeup reel 5. The aforesaid cavity is open on its side facing stationary wall 9. On this side, radial supporting wall 4 is in the form of a radial flange integral with the end of wall 14 which faces wall 9. In the second position of housing 1, supporting wall 4 forms a radial extension of the end surface of takeup reel 5 so that in said second housing position the microfilm coil on takeup reel 5 comes to lie between housing wall 9 and supporting wall 4. Reference is made in this respect to the explanations below.

The previously mentioned mechanism 7, the means by which the free end of a microfilm 6, which has been introduced through passage 2 into the aforesaid cavity 11 with housing 1 in its first position, is pressed down onto the peripheral surface of takeup reel 5, comprises a ball 12 of which the bottom portion projects through an opening 13 in wall 14 surrounding the peripheral surface of takeup reel 5 and radially defining the aforesaid cavity. Ball 12 is urged against the peripheral surface of takeup reel 5 by spring means, such as preferably a helical spring 15. Spring 15 and the portion of ball 12 which projects outwardly from wall 14 are enclosed by a housing member 16 which preferably is secured to the surface of supporting wall 4 which faces away from wall 9. Housing member 16 is closed at its end opposite the opening through which ball 12 projects, with spring 15 bearing against the closed end.

Preferably, housing portion 16 is secured to supporting wall 4 by suitable means for radial displacement in the long direction of spring 15. This way, the compressive force generated by spring 15 to urge ball 12 against the peripheral surface of takeup reel 5 may be adjusted in a very simple manner.

The following description will be concerned with the pivoting of shifting means by means of which the housing 1 may be moved between its first and second positions in the direction of the axis of the takeup reel 5. Preferably, this shifting means in its simplest form comprising an L-shaped arm 25 mounted for rotation on housing 1 and actuated by a solenoid 26 against the bias of a spring 27 to maintain the housing in its first position while the solenoid 26 is energized. Deenergizing solenoid 26 causes arm 25 to be moved by the force of spring 27 so that housing 1 is moved to about stop means (not shown in FIGS. 2 and 3) defining the second position. For example, L-shaped arm 25 may be mounted for rotation about pivot 29 in the area where its two legs join at a right angle. The previously mentioned spring 27 is connected at one end thereof to the free end of one leg of arm 25 and at the other end to wall 9, for example. The free end of the other leg may have therein an elongated slot 30 to receive a pin 31 provided on an extension 28. Extension 28 preferably is integral with housing portion 3. As housing 1 moves, pin 31 will slide between first and second positions in elongated slot 30.

The operation of the assembly described above for feeding the free end of a microfilm to a takeup reel and for winding up the microfilm on that reel will now be explained in detail. At first, housing 1 is taken to its first position, as by energizing solenoid 26. In that first position, passage 2 is aligned with guide roll 8 and housing portion 3 encloses takeup reel 5 in the manner described above. Ball 12, portions of which project from opening 13 in wall 14, engages the peripheral surface of takeup reel 5, with the ball being urged far enough into housing portion 16 against the force of spring 15 so as not to engage marginal portions of opening 13 and to rotate freely. The free end of microfilm 6 from the viewing station is introduced now via guide roll 8 through inlet opening 23 into guiding passage 2. Takeup reel 5 is rotated so as to move at a circumferential speed slightly higher than the speed of advance of microfilm 6. From outlet opening 24, the free end of microfilm 6 will enter the gap 11 between the peripheral surface of takeup reel 5 and wall 14 of housing portion 3 and then pass the area where ball 12 engages the peripheral surface of takeup reel 5. The free end of microfilm 6 will be guided around the periphery of takeup reel 5 to again pass through under ball 12; as a result, after one complete reel rotation, ball 12 rests on two layers of microfilm 6. As takeup roll 5 rotates at a circumferential speed slightly higher than the speed of microfilm advance, and as the force the spring exerts urges ball 12 against the layers of film underneath, a firmly wound-up coil of film will be formed on the peripheral surface of takeup reel 5. Once a predetermined length of microfilm 6 has been wound up on takeup reel 6 in the first position of housing 1, the advance of microfilm 6 and the rotation of takeup reel 5 are interrupted briefly, with the housing 1 pivoted to its second position shown in FIG. 3 by de-energizing solenoid 26. In this position, passage 2 and portion 3 of housing 1 are outside the area of microfilm 6 and takeup reel 5. As opening 13 in wall 14 of housing portion 3 is smaller than the diameter of ball 12, ball 12 will be retained in housing portion 16. As shown in FIG. 3, rotation of takeup reel 6 can be started anew to wind up microfilm 6 on takeup reel 5, with the microfilm coil being secured against lateral displacement or displacement in the direction of the axis of takeup reel 5 in the area between wall 9 and supporting wall 4 of housing 1.

It should be noted that the apparatus described above is advantageous in terms of power consumption in that solenoid 26 needs to be energized at the beginning of the winding-up operation only.

Takeup reel 5 is rotated on its shaft 51 by a motor (not shown) disposed behind wall 9 of the microfilm apparatus.

Figure 5:
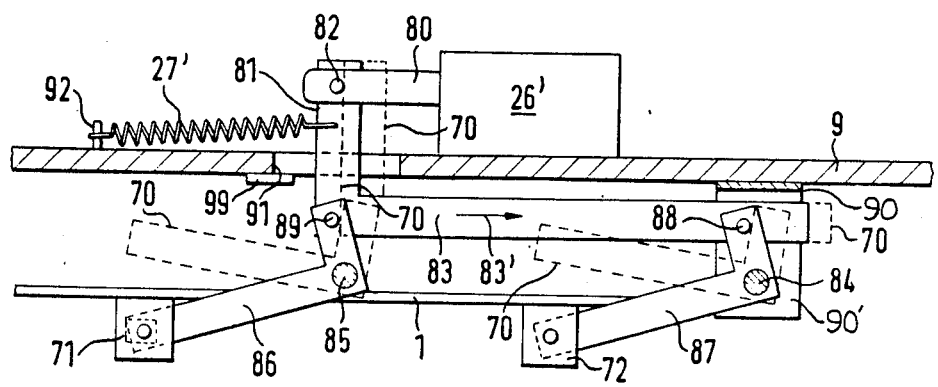

There will now be described under reference to FIGS. 4 and 5 a particularly preferred embodiment of the means to move housing 1 between its first and second positions. Details in FIGS. 4 and 5 which have been described under reference to FIGS. 1 to 3 are marked by the same reference numerals. As shown in FIGS. 4 and 5, projections 71, 72, 73 are provided on housing 1 on the side thereof turned away from wall 9. Projection 71 is provided on the side of housing 1 facing guide roll 8 and preferably below passage 2 adjacent inlet opening 23 thereof; projections 72, 73 are provided one above the other on supporting wall 4 on the side facing away from guide roll 8. Correspondingly, there are provided for displacing housing 1 in the direction of the axis of takeup reel 5 three arms 86, 87, 88, each of which is L-shaped and mounted for rotation about a stationary vertical axis adjacent the juncture of its two legs. Stated in greater detail: arm 86 is mounted for rotation about stationary pin 85, with the latter secured in the manner shown in FIG. 4 to a holding member 74 secured on wall 9. Arms 87 and 88 are mounted in a spaced relationship for joint rotation on a vertical rod 84 extending through the areas of connection of the two legs of each of arms 87 and 88. Preferably, rod 84 is mounted for rotation in opposite bores of legs 90 of a U-shaped holder 90 secured to wall 9. The free end of one leg of each of arms 87, 88 is mounted for rotation about a vertical axis in a projection 72 or 73, respectively. The free end of one leg of arm 86 is mounted for rotation in projection 71. The free ends of the other legs of arms 86, 87, which are disposed below housing 1, are mounted rotatably on a pusher bar 83 actuatable by a solenoid 26'. Displacement of pusher bar 83 in the direction indicated by arrow 83' causes arms 86, 87 to be swung from the position shown in solid lines in FIG. 5, which corresponds to the aforesaid second position, to the position shown in FIG. 5 by broken lines 70, which corresponds to the aforesaid first position. Pusher bar 83 is actuated in the direction of arrow 83' by a transverse arm 81 formed integral with pusher bar 83 and extending through an opening 91 in wall 9, said transverse arm being moved by a solenoid 26', which preferably is mounted on the side of wall 9 facing away from housing 1, in the direction of arrow 83' against the force of a spring 27' having one of its ends secured to transverse arm 81 and its other end fixed by a pin 92 to wall 9. Arm 88 which is fixedly mounted on shaft 84, follows the movement of arm 87. As housing 1 is moved with the aid of the three arms 86, 87 and 88, which in turn are moved by pusher bar 83, housing 1 will safely and reliably be held in a precisely defined plane, i.e., the vertical plane, as it is displaced in the direction of the axis of takeup reel 5. Energizing solenoid 26' automatically causes the first position to be maintained against the force of spring 27'. With solenoid 26' de-energized, spring 27' pulls transverse arm 81 against a stop 99 as provided on wall 9 in the area of opening 91 so as to determine the second position.

To dissipate static charges, another roll 76 may be provided which extends into gap 11 and is urged against the peripheral surface of the takeup reel, as shown in FIG. 4. Roll 76 is mounted for rotation on the free end of an elongated arm 77 of which the other end is pivotally mounted on the wall. Preferably, the required holddown pressure is provided by a spiral spring 79 placed on pin 78 and having its ends secured on wall 9 and on elongated arm 77, respectively. Roll 76 projects into gap 11 through an opening 53 in wall 14 of housing portion 3. Another opening 54 is provided in supporting wall 4 so that it may be moved past roll 76 an elongated arm 77 while being moved from its second to its first position.

The microfilm apparatus may include microswitches or the like devices (not shown) to be actuated when the housing reaches its first or second position, with the operative status of such microswitches being evaluated electronically to detect whether the first or second position has in fact been reached.

The afore-mentioned possibility of displacing housing 16 in the longitudinal direction of helical spring 15 in order to adjust the pressure exerted by ball 12 may be obtained preferably by housing portion 16 including a lateral plate-shaped projection 10 having a bore therethrough to receive a screw to be threaded into housing 1, said screw arranged to move along an elongated slot 10 in housing 1 which extends in the longitudinal direction of compression spring 15.

As shown in dotted outline in FIG. 2, cover 95 may be secured to wall 9 in alignment with housing 1. That cover has a projection 96 extending towards housing 1 in the plane of the lower wall 21 of guide passage 2. With housing 1 in its first position, that projection ensures a very efficient guidance of a broad leader strip of the microfilm. Conveniently, cover 95 has a wall portion integral therewith and corresponding to supporting wall 4 so that the microfilm coil will be guided between the aforesaid wall portion and the supporting wall in the aforesaid second position.

We claim:

1. Apparatus for feeding the free end of a microfilm to a takeup reel and for winding the microfilm thereon, including means laterally enclosing the coil formed on the takeup reel, said apparatus comprising:

a housing mounted for movement between a first and a second position in the direction of the axis of said takeup reel, said housing including a feed passage means and a housing portion aligned with said passage means, said housing portion including a wall concentrically surrounding said takeup reel in said first position of said housing and being moved away from said takeup reel in said second position of said housing, said feed passage and said housing portion being open on the side facing said takeup reel in said second position of said housing and being substantially closed in said first position by a stationary wall, said feed passage means being oriented in said first position of said housing for receiving said free end of said microfilm and to introduce said end between the peripheral surface of said takeup reel and the inner surface of said housing portion, said housing having a supporting wall disposed in said second position in a plane normal to said axis of said takeup reel adjacent one side of said film coil wound on said takeup reel, and wherein said stationary wall is disposed on the other side of and laterally adjacent said film coil; and means for pressing said free end of said microfilm against said peripheral surface of said takeup reel, including a ball, a spring resiliently biasing said ball toward said takeup reel, and an opening in said housing portion wall through which said ball projects, said opening having a diameter sufficient to permit contact between said ball and said takeup reel but a diameter less than that of said ball to prevent passage of said ball through said opening when said housing is in said second position.

2. Apparatus according to claim 1 wherein said spring is a coiled spring and wherein said means for pressing further includes a cylinder adjacent said housing portion and enclosing said ball and said spring, said cylinder having a closed end against which said spring bears to bias said ball.

3. Apparatus according to claim 2 further including means mounting said cylinder for adjustment of said cylinder relative to said housing portion in a direction parallel to the axis of said coiled spring.

4. Apparatus for feeding the free end of a microfilm to a takeup reel and for winding the microfilm thereon, including means laterally enclosing the coil formed on the takeup reel, said apparatus comprising:

a housing mounted for movement between a first and a second position in the direction of the axis of said takeup reel, said housing including a feed passage means and a housing portion aligned with said passage means, said housing portion including a wall concentrically surrounding said takeup reel in said first position of said housing and being moved away from said takeup reel in said second position of said housing, said feed passage and said housing portion being open on the side facing said takeup reel in said second position of said housing and being substantially closed in said first position by a stationary wall, said feed passage means being oriented in said first position of said housing for receiving said free end of said microfilm and to introduce said end between the peripheral surface of said takeup reel and the inner surface of said housing portion, said housing having a supporting wall disposed in said second position in a plane normal to said axis of said takeup reel adjacent one side of said film coil wound on said takeup reel, and wherein said stationary wall is disposed on the other side of and laterally adjacent said film coil;

means for pressing said free end of said microfilm against said peripheral surface of said takeup reel and disposed to grasp said free end of said microfilm advanced thereto by said feed passage when said housing is in said first position; and means for moving said housing between said first and said second positions including a first arm attached to said housing adjacent said inlet opening, a second arm attached to said housing on one side of said takeup reel axis, a third arm attached to said housing opposite said one side of said takeup reel axis relative to said takeup reel axis, a solenoid for simultaneously actuating said arms and moving said housing to said first position when said solenoid is energized, a connecting link connecting said arms and said solenoid and a spring attached to said connecting link for moving said housing to said second position when said solenoid is de-energized.

* * * * *